United States Patent
Lawrence et al.

(10) Patent No.: US 7,688,906 B2
(45) Date of Patent: Mar. 30, 2010

(54) WIRELESS FRAME HAVING ALTERNATING CYCLIC PREFIXES

(75) Inventors: Sean J. Lawrence, Bangalore (IN); Ashim Biswas, Bangalore (IN); Anees A. Sahib, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 11/540,411

(22) Filed: Sep. 29, 2006

(65) Prior Publication Data

US 2008/0080626 A1     Apr. 3, 2008

(51) Int. Cl.
*H04K 1/10* (2006.01)
*H04L 27/28* (2006.01)
(52) U.S. Cl. ........................ 375/260; 370/203
(58) Field of Classification Search ........... 375/260; 370/203–211
See application file for complete search history.

(56) References Cited

U.S. PATENT DOCUMENTS

| | | | | |
|---|---|---|---|---|
| 6,839,429 B1 * | 1/2005 | Gaikwad et al. | ............ | 379/417 |
| 2002/0150154 A1 * | 10/2002 | Warke | ................. | 375/222 |
| 2008/0049851 A1 * | 2/2008 | Nangia et al. | ............... | 375/260 |

OTHER PUBLICATIONS

Muquet, Bertrand, et al., "Cyclic Prefixing or Zero Padding for Wireless Multicarrier Transmissions?", *IEEE Transactions on Communications*, vol. 50, No. 12, (Dec. 2002),2136-2148.

Sun, Yi, et al., "Channel Equalization for Wireless OFDM Systems with ICI and ISI", *IEEE International conference on communications*, vol. 1, (Jun. 1999),182-186.

Wang, Zhengdao, et al., "Wireless Multicarrier Communications Â? Where Fourier Meets Shannon", *IEEE Signal Processing Magazine*, (May 2000),29-48.

\* cited by examiner

*Primary Examiner*—Curtis B Odom
(74) *Attorney, Agent, or Firm*—Lee & Hayes, PLLC; Jason F. Lindh (57) ABSTRACT

Method and embodiments in a multipath wireless communication system employing a wireless frame having alternating cyclic prefixes to reduce inter-symbol interference (ISI) are presented herein.

15 Claims, 6 Drawing Sheets

WIRELESS FRAME HAVING ALTERNATING CYCLIC PREFIXES

BACKGROUND

In wireless communications systems, multipath is one of many concerns that may affect performance of a wireless communication. Multipath, for instance, may cause signals from a previous symbol to interfere with signals from a subsequent symbol, which is know as inter-symbol interference (ISI). Although traditional techniques have been developed to combat ISI, these techniques significantly reduce the amount of bandwidth that is available to communicate over a wireless medium.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform techniques to modulate, transmit, receive and demodulate a frame having alternating cyclic prefixes Exemplary procedures are then described that may be employed in the exemplary environment, as well as in other environments.

Exemplary Environment

Figure 1:
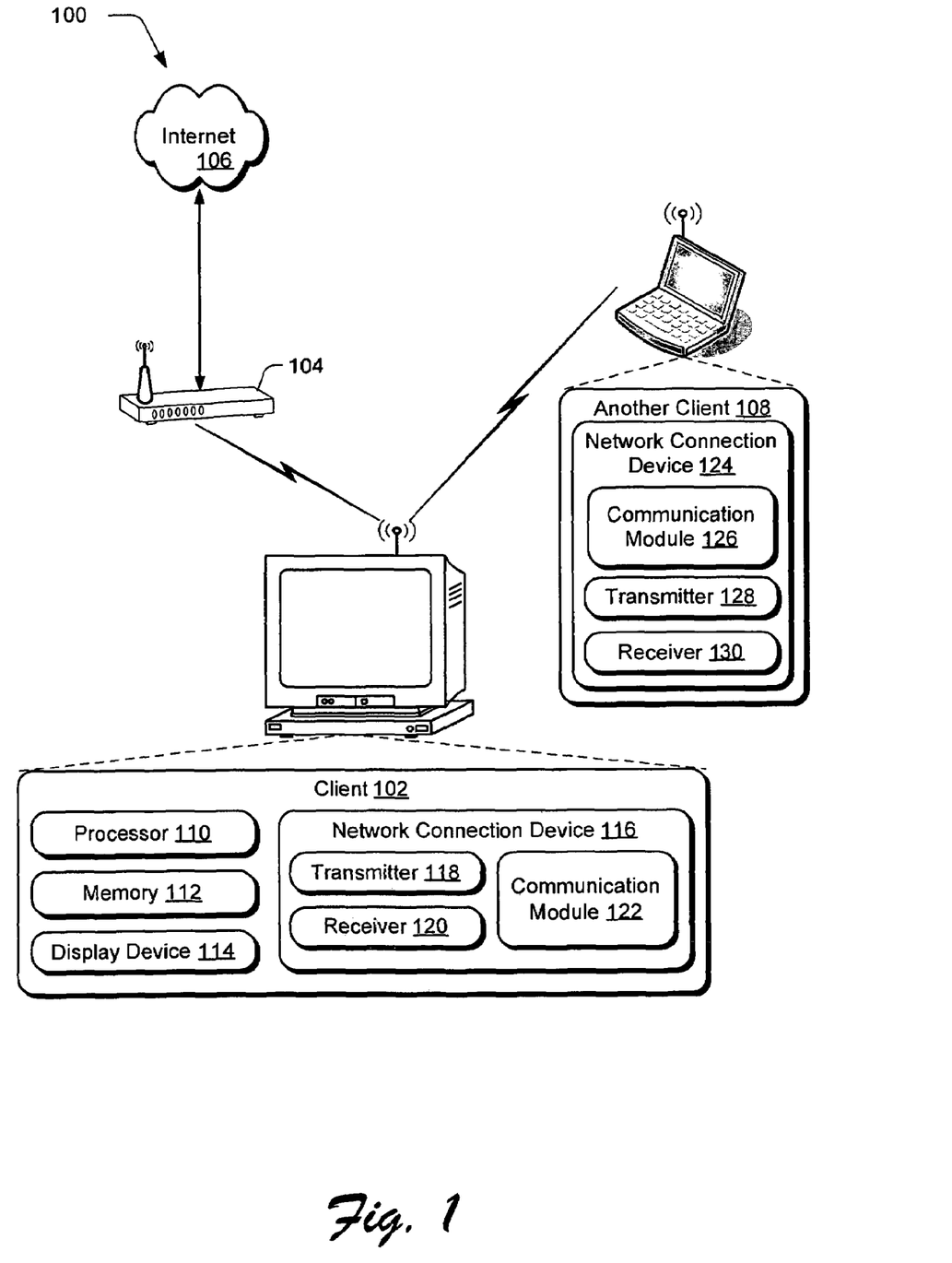
FIG. 1 is an illustration of an environment in an exemplary implementation that is operable to employ techniques to transmit frames wirelessly having alternating cyclic prefixes.

FIG. 1 is an illustration of an environment 100 in an exemplary implementation that is operable to employ alternating cyclic prefix techniques. The illustrated environment 100 includes a client that is communicatively coupled, wirelessly, to a base station 104 that is configured to provide internet access and another client 108. The client 102 may be configured in a variety of ways, such as a traditional desktop computer as illustrated, as wireless phone, a game console, a personal digital assistant, a laptop as illustrated for the other client 108, and so on. The client 102, in portions of the following discussion, may also relate to a person and/or entity that operate the client. In other words, the clients 102 may describe logical clients that include users, software, and/or devices.

The client 102 as illustrated includes a processor 110, memory 112 a display device 114 and a network connection device 116. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Although a single memory 112 is shown, a wide variety of types and combinations of memory may be employed; such as random access memory (RAM), hard disk memory, removable medium memory, and other types of computer-readable media. Further, although a display device 114 illustrated as a monitor is shown, the display device may assume a variety of configurations to output data.

The network connection device 116 is configured to provide wireless communication through use of a transmitter 118, receiver 120 and a communication module 122. The network connection device 116 may be configured to be included in a variety of systems, such as a single or multi-antenna system that may include a variety of types of antennas, such as dipole antennas. The communication module 122 is representative of functionality that is usable to manage wireless communication performed by the network connection device 116. For example, the communication module 122 may function to modulate signals to be transmitted by the transmitter 118 and to demodulate signals received by the receiver 120. The network connection device 116, for instance, may form a wireless network connection with the other client 108 that also has a network connection device 124 having a communication module 126, transmitter 128 and receiver 130. Therefore, the client 102 and the other client 108 may communicate back and forth wirelessly through use of the respective network connection devices 116, 124 which may be configured in accordance with a variety of protocols and standards.

As previously described, however, multipath is one of many concerns that may affect wireless communication performance. For example, multipath may cause previous signals to interfere with "current" signals. Although traditional techniques have been developed to combat multipath, these techniques significantly reduce the amount of bandwidth that is available to communicate over a wireless medium. One such previous technique involved the incorporation of a cyclic prefix with each symbol being wirelessly transmitted, and therefore reduced the amount of bandwidth available over the connection that was consumed by the cyclic prefix.

Accordingly, the communication modules 122, 126 in the environment 100 of FIG. 1 may incorporate techniques in which alternating cyclic prefixes are incorporated within wireless frames transmitted and received by the communication modules 122, 126. Therefore, the amount of bandwidth consumed by the cyclic prefixes is reduced, thereby improving the amount of bandwidth available to communicate data as desired by the client yet may still preserve the integrity of the data, further discussion of which may be found in relation to the following figure.

Figure 2:
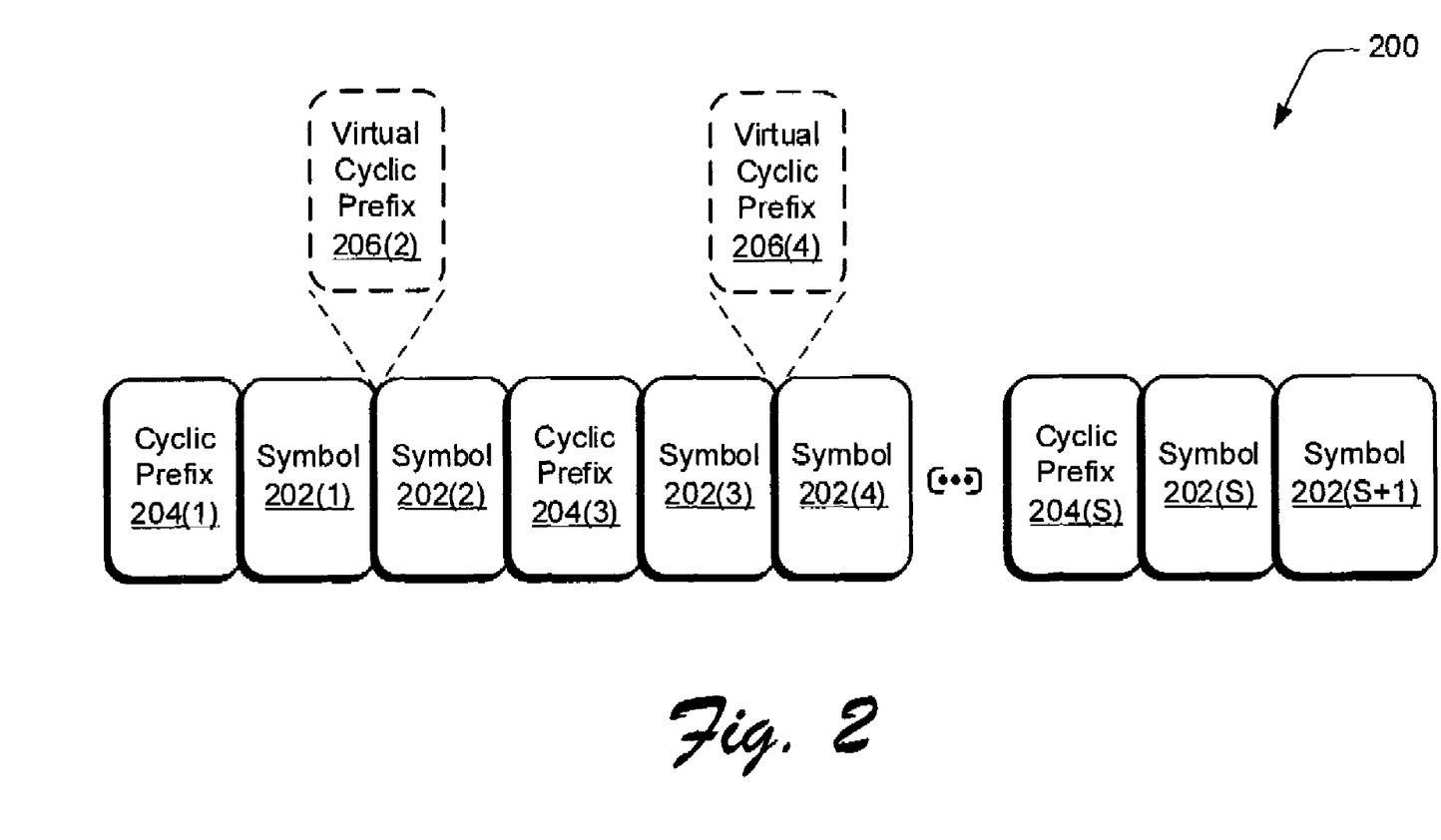
FIG. 2 is an illustration of one or more wireless frames in an exemplary implementation having alternating cyclic prefixes.

FIG. 2 depicts an exemplary implementation of a frame structure 200 having alternating cyclic prefixes. The frame structure 200 includes a plurality of symbols 202(1), 202(2), 202(3), 202(4), 202(S), 202(S+1). The symbols 202(1)-202 (S+1) represent data to be transmitted by or received from a client, such as eight bit representations of characters and so on. Cyclic prefixes are associated with alternating symbols, such that symbol 202(1) has an associated cyclic prefix 204(1), symbol 202(3) has an associated cyclic prefix 204(3), symbol 202(S) has an associated cyclic prefix 204(S), and so on.

As shown in the frame structure of FIG. 2, however, symbols 202(2), 202(4), 202(S+1) do not have associated cyclic prefixes, which makes additional bandwidth available in the frame structure 200 over traditional techniques. In order to correctly demodulate the symbols, techniques may be applied to account for the lack of a cyclic prefix for each symbol.

For example, the communication modules 122, 126 may incorporate techniques to estimate inter-symbol interference due to each of the symbols and use the estimates to correctly demodulate the symbols. In effect, these techniques may facilitate a virtual cyclic prefix 206(2), 206(4) for respective symbols 202(2), 202(4) that are transmitted without a cyclic prefix. Further discussion of these techniques may be found in relation to the following procedures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU, CPUs, a processor of a network connection device 116, and so on). The program code can be stored in one or more computer readable memory devices, e.g., memory within the network connection device 116. Thus, although the processor 110 and memory 112 are illustrated as "outside" the network connection device 116 in client 102, the processor 110 and memory 112 and even display device 114 (e.g., indication lights) may be incorporated within the network connection device 116. The features of the techniques to alternating cyclic prefix in wireless frames described below are platform-independent, meaning that the techniques may be implemented on a variety of commercial computing platforms having a variety of processors.

Exemplary Procedures

The following discussion describes modulation and demodulation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the one or more frames 200 of FIG. 2.

Figure 3:
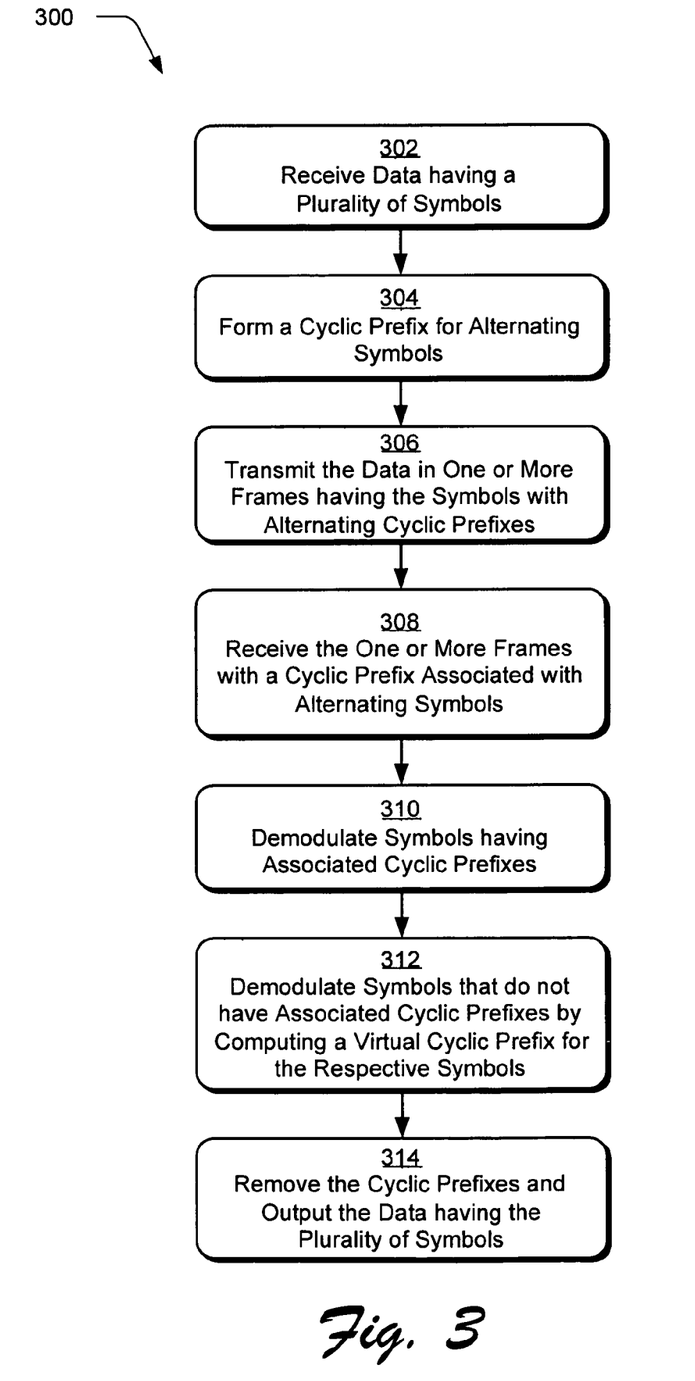
FIG. 3 is a flow diagram depicting a procedure in an exemplary implementation in which data having a plurality of symbols is modulated to be transmitted using alternating cyclic prefixes and demodulated by computing a virtual cyclic prefix for symbols that do not have associated cyclic prefixes.

FIG. 3 depicts a procedure in an exemplary implementation in which data having a plurality of symbols is modulated to be transmitted using alternating cyclic prefixes and demodulated by computing a virtual cyclic prefix for symbols that do not have associated cyclic prefixes. Data having a plurality of symbols is received (block 302), such as received by a communication module 122 from an application being executed on the processor 110, which is storable in memory 112.

A cyclic prefix is formed for alternating symbols (block 304). As shown in FIG. 2, for instance, a cyclic prefix 204(1) may be formed for symbol 202(1), a cyclic prefix 204(3) formed for symbol 202(3), and so on. The cyclic prefixes may be configured in a variety of ways, such as a repetition of data contained within the associated symbol, and so on.

The data is then transmitted in one or more frames having the symbols with alternating cyclic prefixes (block 306). Thus, as least one of the symbols is not associated with a cyclic prefix, e.g., symbols 202(2), 202(4).

The one or more frames having a cyclic prefix associated with alternating symbols is received (block 308). The symbols having the associated cyclic prefixes are demodulated, such as through estimation of inter-symbol interference which is described in greater detail in FIG. 5.

The symbols which do not having an associated cyclic prefix are demodulated by computing a virtual cyclic prefix for the respective symbols (block 312). The virtual cyclic prefix, for instance, may be computed as a part of a previously transmitted symbol, further discussion of which may be found in relation to FIG. 6. Therefore, the cyclic prefixes may then be removed and the data output (block 314), such as to an application that consumes the data that is executing on the processor of the client. A variety of techniques may be used to demodulate frames having alternating cyclic prefixes, such as through calculation of inter-symbol interference which is described in greater detail in the following example.

Figure 4:
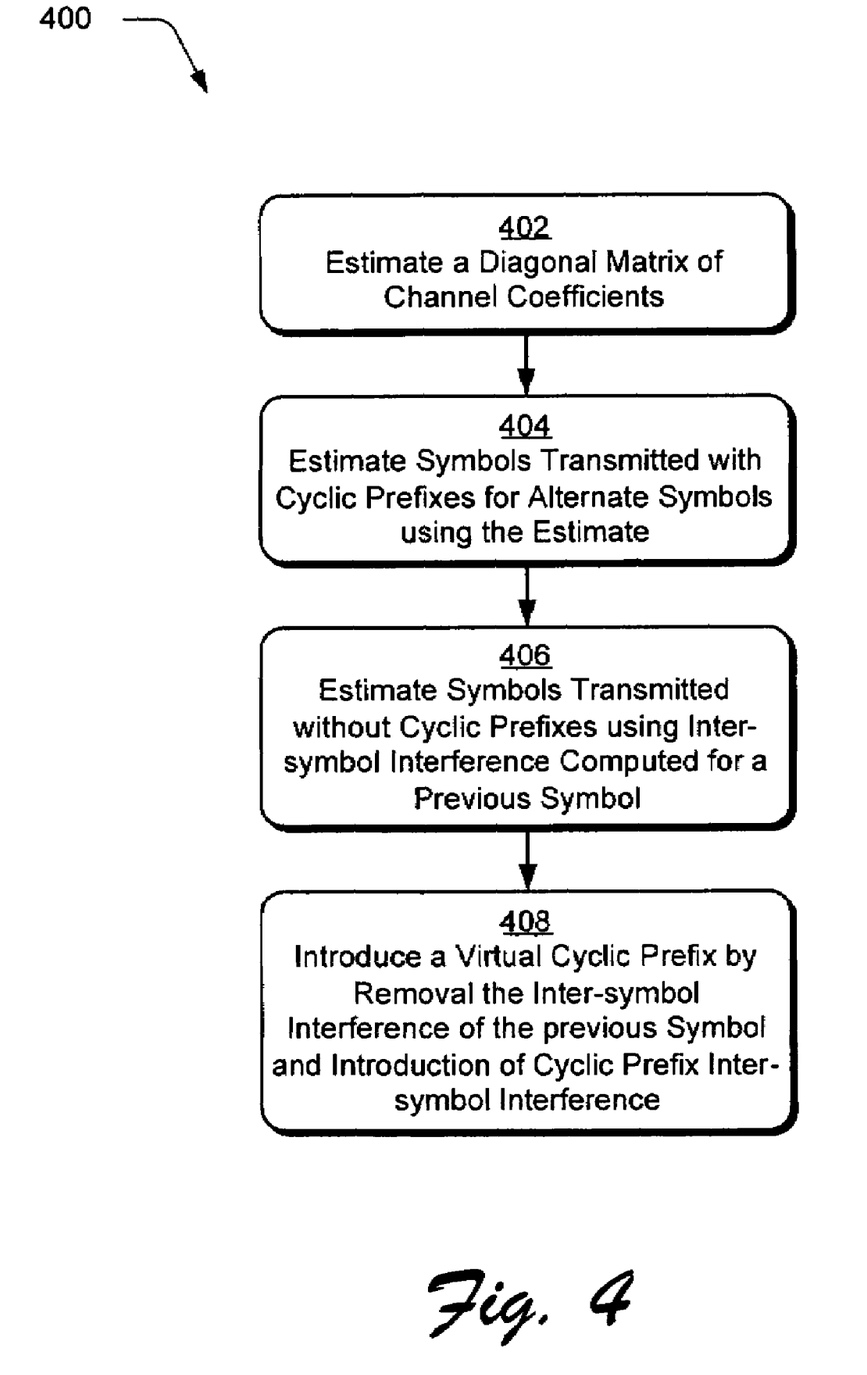
FIG. 4 is a flow diagram depicting a procedure in an exemplary implementation in which symbols are demodulated through estimation of inter-symbol interference (ISI) due to each of a plurality of symbols included in data that is wirelessly transmitted.

FIG. 4 depicts a procedure in an exemplary implementation in which symbols are demodulated through estimation of inter-symbol interference (ISI) due to each of a plurality of symbols included in data that is wirelessly transmitted. As previously described, techniques may be employed in a wireless network in which, a cyclic prefix of each alternate symbol in a frame (e.g., an orthogonal frequency division multiplexing (OFDM) frame) is not transmitted, thereby reducing bandwidth loss. A variety of techniques may be used to demodulate frames having symbols which do not have an associated cyclic prefix.

In the following exemplary technique, inter-symbol interference (ISI) affecting each symbol may be estimated and the ISI estimates used to correctly demodulate the symbols. In effect, this technique may facilitate a virtual cyclic prefix for symbols transmitted without a cyclic prefix. The alternate symbols having cyclic prefixes preserve channel equalization simplicity, such as used in typical cyclic prefix/orthogonal frequency division multiplexing (CP/OFDM). As should be appreciated, these techniques are not limited to single antenna system and may also be employed by multi-antennal systems.

For purposes of the following discussion, the frequency domain vectors of length N are defined as follows:

$X_m$ is defined as the $m^{th}$ transmitted symbol;

H represents a diagonal matrix of channel coefficients;

$Y_m$ relates to an "$m^{th}$" received symbol;

$Y_{mCP}$ is defined as the cyclic prefix of the "$m^{th}$" received symbol;

$Y_{mISI}$ represents ISI due to the "$m^{th}$" symbol;

where, N is the total number of subcarriers per symbol; and the estimated value for any vector a is denoted by â.

Reference will now be made again to FIG. 2, if "M" is the number of transmitted symbols in a given frame, then each symbol transmitted with a cyclic prefix is received as expressed by the following equation:

$$Y_m = Y_{mISI} + Y'_m = HX_m \text{ where, } m=1, 3, \ldots M, \quad \text{Equation (1)}$$

In the above equation, $Y'_m$ represents a symbol without ISI, H is the channel as previously described and $X_m$ is the symbol. It should be noted that H is rendered diagonally by the use of cyclic prefix.

If $X_1$ is known (e.g., by preamble or another known sequence) then a diagonal matrix of channel coefficients H can be estimated (block 402) from the following equation:

$$\hat{H} = \frac{Y_1}{X_1} \quad \text{Equation (2)}$$

Using channel estimate $\hat{H}$ it is possible to estimate symbols transmitted with cyclic prefixes for each of the alternate frames (block 404), e.g., m=1, 3, . . . M, as shown by the following equation:

$$\hat{X}_m = \frac{Y_m}{\hat{H}} \quad \text{Equation (3)}$$

For symbols transmitted without a cyclic prefix (e.g., the "other" alternate symbols, such as where m=2, 4, . . . , M−1), the symbols may be estimated as follows:

$$Y_m = Y_{(m-1)ISI} + Y'_m \quad \text{Equation (4)}$$

In the above equation, $Y_{(m-1)ISI}$ is the ISI from the previous symbol (block 406).

In order to use $\hat{H}$ to equalize the $m^{th}$ received symbol $Y_m$ to obtain an estimate of $X_m$, the effects of a cyclic prefix for a symbol that has been transmitted without one may be introduced. As the cyclic prefix shields a symbol from the ISI due to the previous symbol, the ISI from the previous $(m-1)^{th}$ symbol $Y_{(m-1)ISI}$ is removed from $Y_m$. Further, the cyclic prefix by itself adds ISI to its corresponding symbol. As a result, the $m^{th}$ symbol cyclic prefix ISI $Y_{mISI}$ is added to $Y_m$. $Y_{(m-1)ISI}$ and $Y_{mISI}$ may be estimated using knowledge of the estimated channel coefficients and the already equalized symbols that were transmitted with a cyclic prefix. Hence, by removing the previous symbol ISI and introducing the cyclic prefix ISI, a "virtual cyclic prefix" is introduced for a symbol that has been transmitted without one (block 408). As a result:

$$Y_m + Y_{mISI} - Y_{(m-1)ISI} = Y'_m + Y_{mISI} = HX_m \quad \text{(from equation (1))}$$

This implies the following:

$$X_m = \frac{Y_m + Y_{mISI} - Y_{(m-1)ISI}}{H} \quad \text{Equation (5)}$$

By estimating and using the ISI components $\hat{Y}_{mISI}$ and $\hat{Y}_{(m-1)ISI}$ in Equation (5), $X_m$ can be estimated:

$$\hat{X}_m = \frac{Y_m + \hat{Y}_{mISI} - \hat{Y}_{(m-1)ISI}}{\hat{H}} \quad \text{Equation (6)}$$

As a result, the channel matrix is once again rendered diagonal allowing equalization for those symbols transmitted without a cyclic prefix. In order to estimate $Y_{(m-1)ISI}$ and $Y_{mISI}$ in this implementation, however, $\hat{X}_{m-1}$ and $\hat{X}_{m+1}$ are first obtained. Hence, if the "mth" symbol $X_m$ has been transmitted without a cyclic prefix then $X_{m-1}$ and $X_{m+1}$ (which are both transmitted with cyclic prefixes) are demodulated before $X_m$ by Equation (3).

Figure 5:
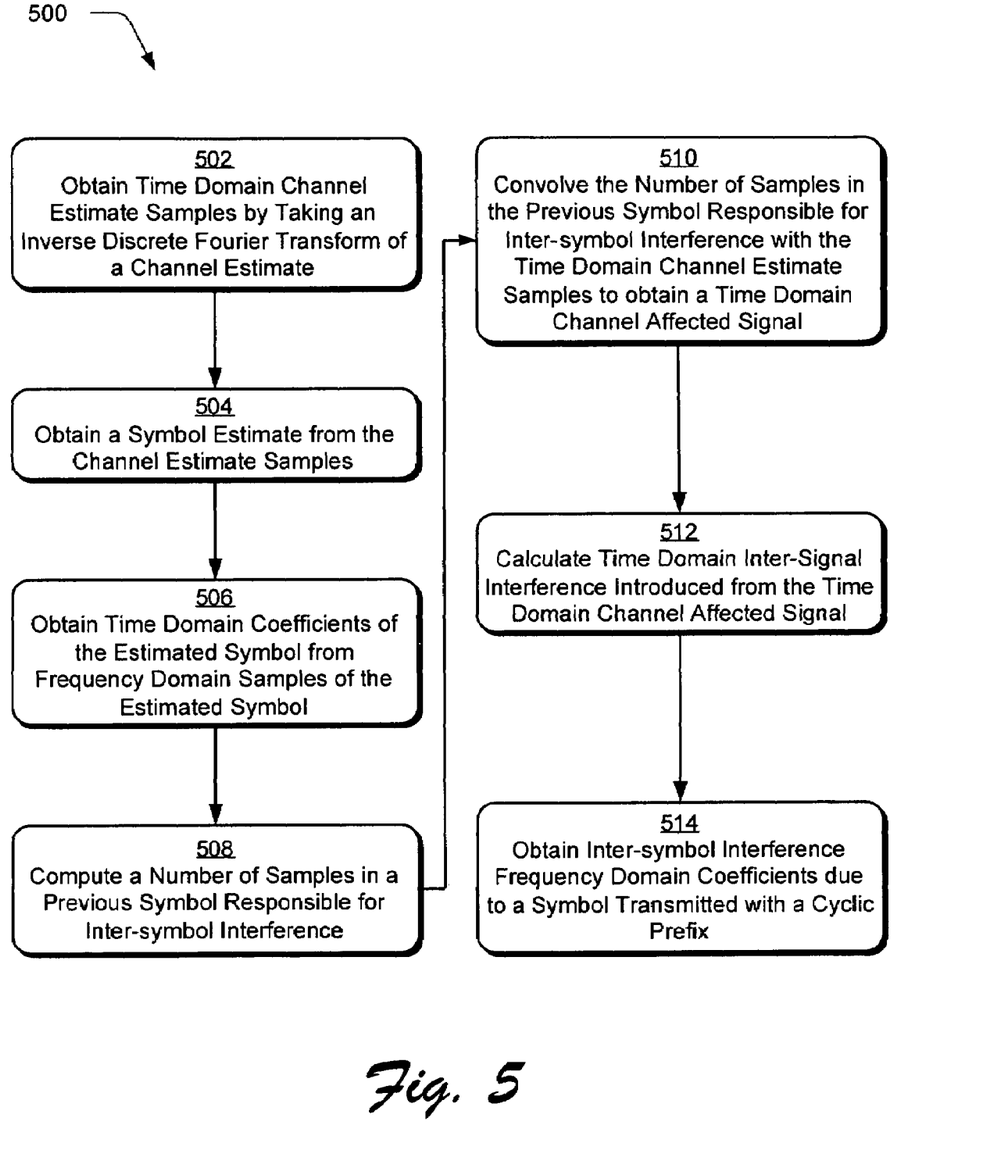
FIG. 5 is a flow diagram depicting a procedure in an exemplary implementation in which inter-symbol interference is estimated of a symbol having an associated cyclic prefix.

FIG. 5 depicts a procedure in an exemplary implementation in which inter-symbol interference is estimated of a symbol having an associated cyclic prefix. Time domain channel estimate samples $\hat{h}$ are obtained by taking the Inverse Discrete Fourier Transform (IDFT) of a channel estimate $\hat{H}$ (block 502) where k is a frequency domain sample, n is a time domain index, with L representing a length of the channel (most significant time domain channel taps), as expressed in the following equation:

$$\hat{h}(n) = \Sigma_{k=0}^{N-1} \hat{H}(k) e^{j2\pi nk/N} \text{ where, } n=0, 1, \ldots L-1 \quad \text{Equation (7)}$$

After estimating $X_m$ from the channel estimate samples (e.g., by equation (3)) (block 504), the time domain coefficients of the "mth" symbol $x_m$ are obtained from frequency domain samples of the "mth" symbol estimate (block 506), which may be expressed as follows:

$$\hat{x}_m(n) = \Sigma_{k=0}^{N-1} \hat{X}_m(k) e^{j2\pi nk/N} \text{ where, } n=0, 1, \ldots N-1 \quad \text{Equation (8)}$$

A number of samples in a previous symbol responsible for inter-symbol interference are computed (block 508). For example, the last L samples in the symbol responsible for ISI (represented as $x'_m$) may be computed using the following equation:

$$x'_m(n) = \hat{x}_m(n+N-L) \text{ where, } n=0, 1, \ldots L-1 \quad \text{Equation (9)}$$

In the above equation, "N" is, a length of the symbol and "L" is a length of a channel.

The number of samples in the previous symbol responsible for inter-symbol interference is convolved with a time domain channel estimate to obtain a time domain channel affected signal. (block 510). Continuing with the previous example, the last L samples in the symbol responsible for ISI $x'_m$ is convolved with the time domain channel estimate $\hat{h}$ to obtain a time domain channel affected signal, which may be expressed as follows:

$$y'_m(n) = \Sigma_{p=0}^{L-1} x'_m(p) \hat{h}(n-p) \text{ where, } n=0, 1, \ldots 2L-1 \quad \text{Equation (10)}$$

A time domain ISI introduced is calculated from the time domain channel affected signal (block 512), such as through use of the following exemplary equation:

$$\hat{y}_{mISI}(n) = \begin{cases} y'_m(n+L) \ldots n < L \\ 0 \ldots n \geq L \end{cases} \quad \text{Equation (11)}$$

The frequency domain coefficients of the ISI due to a symbol transmitted with a cyclic prefix are obtained (block 514), such as by taking N point Discrete Fourier Transform of the time domain ISI calculated in equation (11) as follows:

$$\hat{Y}_{mISI}(k) = \Sigma_{n=0}^{N-1} \hat{y}_{mISI}(n) e^{j2\pi nk/N} \text{ where, } k=0, 1, \ldots N-1 \quad \text{Equation (12)}$$

In this way, inter-symbol interference is estimated of a symbol having an associated cyclic prefix, which may then be used to estimate inter-symbol interference for symbols that do not have a cyclic prefix, an example of which is shown in the following procedure.

Figure 6:
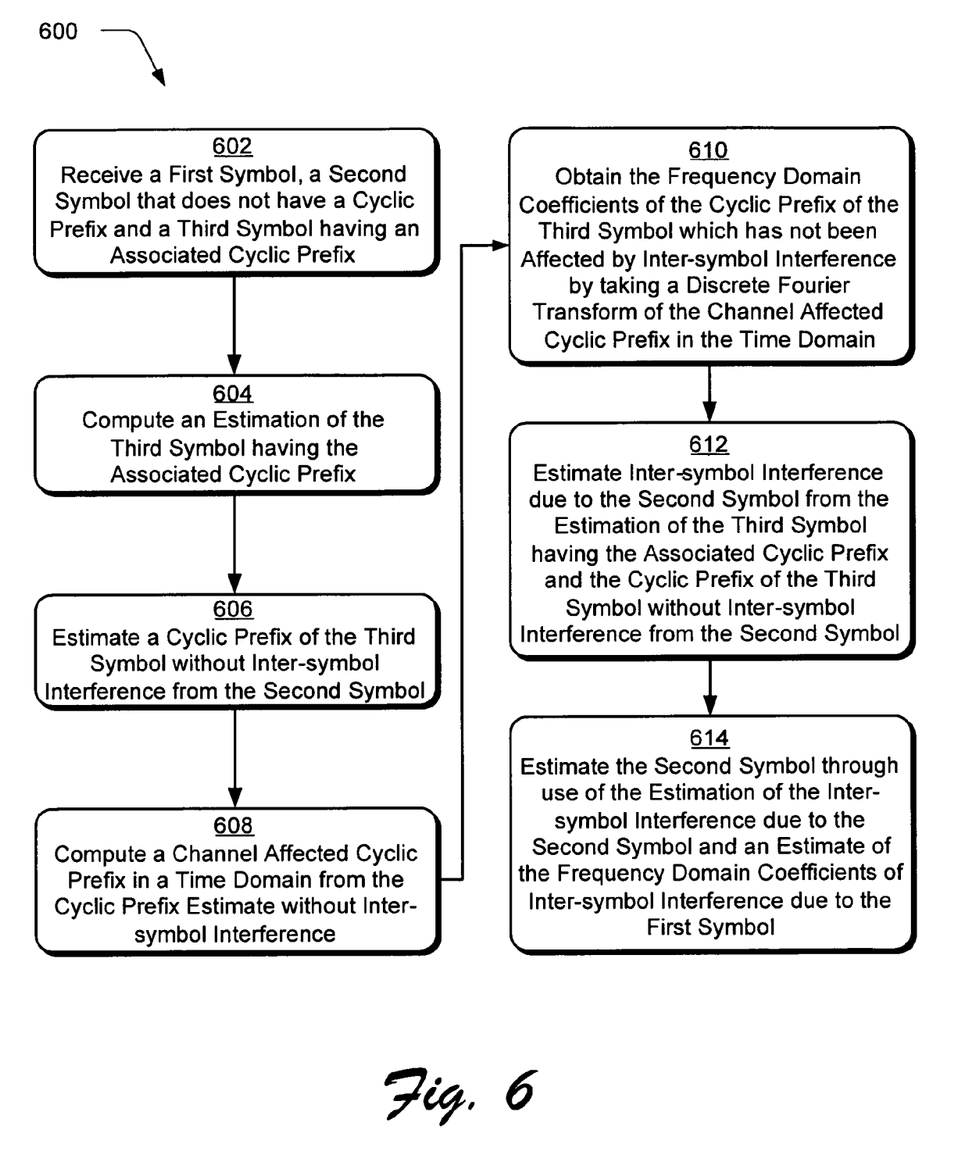
FIG. 6 is a flow diagram depicting a procedure in an exemplary implementation in which inter-symbol interference is estimated of a symbol that does not have an associated cyclic prefix.

FIG. 6 depicts a procedure in an exemplary implementation in which inter-symbol interference is estimated of a symbol that does not have an associated cyclic prefix. For example, a client may receive a first symbol, a second symbol that does not have a cyclic prefix and a third symbol having an associated cyclic prefix (block 602). The first and third symbols, for instance, may have cyclic prefixes, whereas the second does not and therefore the cyclic prefixes are "alternating". For example, if the mth symbol is transmitted without a cyclic prefix, then the (m+1)th symbol will have a cyclic prefix. Therefore, the third symbol having the associated cyclic prefix is estimated (block 604). In this case, $\hat{X}_{m+1}=Y_{m+1}/\hat{H}$ may be computed using equation (3) before equalization of $Y_m$, which may be represented as follows:

$$Y_{(m+1)CP}=Y_{mISI}+Y'_{(m+1)CP} \quad \text{Equation (13)}$$

The cyclic prefix of the received (m+1)th symbol (i.e., the third symbol having the cyclic prefix) is estimated without inter-symbol interference from the mth (i.e., second) symbol (block 606). For example, if $N_{CP}$ is the length of the cyclic prefix, then $x'_{(m+1)CP}$ may be defined as the last $N_{CP}$ samples in the (m+1)th symbol estimate which form the cyclic prefix. Therefore, the following equation may be used to compute cyclic prefix samples without inter-symbol interference from equation (8) above:

$$\hat{x}_{(m+1)CP}(n)=\hat{x}_{M+1}(n+N-N_{CP}) \text{ where, } n=0, 1, \ldots N_{CP}-1 \quad \text{Equation (14)}$$

A channel affected cyclic prefix in time domain is computed from the cyclic prefix estimate without inter-symbol interference (block 608), which may be represented as follows:

$$\hat{y}'_{(m+1)CP}(n)=\sum_{p=0}^{L-1}\hat{x}'_{(m+1)CP}(p)\hat{h}(n-p) \text{ where, } n=0, 1, \ldots N_{CP}-1 \quad \text{Equation (15)}$$

By taking an "N" point Discrete Fourier Transform of the channel affected cyclic prefix in the time domain, the frequency domain coefficients of the cyclic prefix of the (m+1)th symbol (i.e., the third symbol) are obtained which has not been affected by ISI (block 610), as shown in the following expression:

$$\hat{Y}'_{(m+1)CP}(k)=\sum_{n=0}^{N-1}\hat{y}'_{(m+1)CP}(n)e^{-j2\pi nk/N} \text{ where, } k=0, 1, \ldots N-1 \quad \text{Equation (16)}$$

The ISI due to the mth symbol (i.e., the second symbol) may then be estimated from the estimation of the third symbol having the associated cyclic prefix (from equation (13)) and the frequency domain coefficients of the cyclic prefix of the third symbol (from equation (16)) (block 612), which may be represented as follows:

$$\hat{Y}_{mISI}=Y_{(m+1)CP}-\hat{Y}'_{(m+1)CP} \quad \text{Equation (17)}$$

The estimate of $X_m$ may then be obtained by using the estimate of the ISI due to the mth symbol (the second symbol from equation (17)) and the estimate of the frequency domain coefficients of the ISI due to a symbol transmitted with a cyclic prefix, which may be thought of as the "m−1" symbol (i.e., the first symbol) and may be computed through equation (12) as previously described (block 614), such as through substitution in equation (6). Thus, in this way a virtual cyclic prefix for the second symbol may be computed, thereby reducing the effects of multipath on the second symbol even though the second symbol does not have a traditionally associated cyclic prefix. As previously described, it should be readily apparent that these techniques are also applicable to multi-antenna systems.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   a receiver to receive one or more frames having a plurality of symbols, wherein a cyclic prefix is associated with alternating said symbols; and
   a module to demodulate the one or more frames to remove the cyclic prefix to obtain the symbols associated with cyclic prefix and at least one said symbol that is not associated with one or more of the cyclic prefixes, wherein the at least one said symbol is demodulated through calculation of a virtual cyclic prefix.

2. An apparatus as described in claim 1, wherein the virtual cyclic prefix is formed through estimation of inter-symbol interference due to each said symbol.

3. An apparatus as described in claim 1, wherein the virtual cyclic prefix is formed, at least in part, from a portion of a particular said symbol that is received previous to the at least one said symbol.

4. An apparatus as described in claim 1, wherein:
   the one or more frames include a first said symbol, a second said symbol and a third said symbol that are consecutively ordered, one to another;
   the first said symbol and the third said symbol are each associated with a respective said cyclic prefix; and
   the module is to demodulate the one or more frames by demodulating the first and third said symbols having the respective said cyclic prefixes, a result of which is then used to demodulate the second said symbol which does not have an associated said cyclic prefix.

5. An apparatus as described in claim 1, wherein the module is to demodulate the one or more frames through estimation of inter-symbol interference for each said symbol.

6. An apparatus as described in claim 5, wherein the module is to demodulate the symbols having associated cyclic prefixes by:
   obtaining one or more time domain channel estimate samples by taking an Inverse Discrete Fourier Transform of a channel estimate;
   obtaining a symbol estimate from the time domain channel estimate samples;
   obtaining time domain coefficients of the estimated symbol from frequency domain samples of the symbol estimate;
   computing a number of samples in a previous said symbol responsible for inter-symbol interference to the estimated said symbol;
   convolving the number of samples in the previous said symbol responsible for inter-symbol interference with the time domain channel estimate samples to obtain a time domain channel affected signal;
   calculating time domain inter-signal interference introduced from the time domain channel affected signal; and
   obtaining inter-symbol interference frequency domain coefficients due to a particular said symbol transmitted with a respective said cyclic prefix by performing a Discrete Fourier Transform of the time domain inter-signal interference.

7. An apparatus as described in claim 5, wherein:
   the one or more frames include a first said symbol, a second said symbol and a third said symbol that are consecutively ordered, one to another;
   the first said symbol and the third said symbol are each associated with a respective said cyclic prefix; and
   the module is to demodulate the second said symbol that is not associated with a respective said cyclic prefix through:
   computation of an estimation of the third said symbol having the associated cyclic prefix;
   estimation of the cyclic prefix of the third said symbol without inter-symbol interference from the second said symbol;

computation of a channel affected cyclic prefix in a time domain from the cyclic prefix estimate without inter-symbol interference;

obtain the frequency domain coefficients of the cyclic prefix of the third said symbol which has not been affected by inter-symbol interference through performance of a Discrete Fourier Transform of the channel affected cyclic prefix in the time domain;

estimation of inter-symbol interference due to the second said symbol from the estimation of the third said symbol having the associated cyclic prefix and the frequency domain coefficient of the cyclic prefix of the third said symbol; and estimation of the second said symbol through use of the estimation of the inter-symbol interference due to the second said symbol and a frequency domain coefficient estimation of inter-symbol interference due to the first said symbol.

8. One or more computer-readable media comprising executable instructions that, when executed, direct a client to demodulate one or more frames having a first symbol, a second symbol and a third symbol that are consecutively ordered, one to another, and in which the first and third symbols are each associated with a respective cyclic prefix but the second symbol is not, wherein the demodulation includes estimation of inter-symbol interference for each said symbol, wherein the estimation of inter-symbol interference for each said symbol results in computation of a virtual cyclic prefix for the second symbol.

9. One or more computer-readable media as described in claim 8, wherein the executable instructions direct the client to demodulate the first and third symbols by:

obtaining one or more time domain channel estimate samples by taking an Inverse Discrete Fourier Transform of a channel estimate;

obtaining a symbol estimate from the time domain channel estimate samples;

obtaining time domain coefficients of the estimated symbol from frequency domain samples of the symbol estimate;

computing a number of samples in a previous said symbol responsible for inter-symbol interference to the symbol estimate;

convolving the number of samples in the previous said symbol responsible for inter-symbol interference with the time domain channel estimate samples to obtain a time domain channel affected signal;

calculating time domain inter-signal interference introduced from the time domain channel affected signal; and obtaining inter-symbol interference frequency domain coefficients due to a particular said symbol transmitted with a respective said cyclic prefix by performing a Discrete Fourier Transform of the time domain inter-signal interference.

10. A system comprising:

a receiver to receive, via a dipole antenna, one or more frames having a first symbol, a second symbol and a third symbol that are consecutively ordered, one to another, and in which the second symbol is not associated with a cyclic prefix and the first and third symbols are each associated with a respective cyclic prefix; and a communication module to demodulate the first and third symbols, a result of which is used to demodulate the second symbol.

11. A system as described in claim 10, wherein the communication module is to demodulate the first, second and third symbols through calculation of inter-symbol interference for each said symbol.

12. A system as described in claim 10, wherein the communication module is to perform the demodulation such that a virtual cyclic prefix is created for the second symbol.

13. A system as described in claim 10, wherein the network connection device includes multiple antennas.

14. An apparatus comprising:

a receiver to receive one or more frames having a plurality of symbols, wherein a cyclic prefix is associated with alternating said symbols; and a module to demodulate the one or more frames to remove the cyclic prefix to obtain the symbols associated with cyclic prefix and at least one said symbol that is not associated with one or more of the cyclic prefixes, wherein the module is to demodulate the one or more frames through:

estimation of a diagonal matrix of channel coefficients;

estimation of said symbols transmitted with said cyclic prefixes through use of the matrix;

estimation of the at least one said symbol transmitted without a cyclic prefix through use of inter-symbol interference computed for a previously received said symbol; and introduction of a virtual cyclic prefix for the at least one said symbol by removal of the inter-symbol interference computed for the previously received said symbol and introduction of cyclic prefix inter-symbol interference for the at least one said symbol transmitted without the cyclic prefix.

15. A computer-implemented method comprising:

storing, in a client memory, executable instructions for performing the method;

executing the instructions on a client processor;

according to the instructions being executed:

demodulating one or more frames having a first symbol, a second symbol and a third symbol that are consecutively ordered, one to another, and in which the first and third symbols are each associated with a respective cyclic prefix but the second symbol is not, wherein the demodulation includes estimation of inter-symbol interference for each said symbol, wherein the executable instructions direct the client to demodulate the second symbol through:

computing an estimation of the third symbol having the associated cyclic prefix;

estimating the cyclic prefix of the third symbol without inter-symbol interference from the second symbol;

computing a channel affected cyclic prefix in a time domain from the cyclic prefix estimate without inter-symbol interference;

obtaining frequency domain coefficients of the cyclic prefix of the third symbol which has not been affected by inter-symbol interference through performance of a Discrete Fourier Transform of the channel affected cyclic prefix in the time domain;

estimating inter-symbol interference due to the second symbol from the estimation of the third symbol having the associated cyclic prefix and the frequency domain coefficient of the cyclic prefix of the third symbol; and estimating the second symbol through use of the estimation of the inter-symbol interference due to the second symbol and a frequency domain coefficient estimation of inter-symbol interference due to the first symbol.

* * * * *